United States Patent
Lin et al.

(10) Patent No.: US 12,332,951 B2
(45) Date of Patent: Jun. 17, 2025

(54) DATA SEARCH PROCESSING METHOD AND APPARATUS, ELECTRONIC DEVICE, AND STORAGE MEDIUM

(71) Applicant: Beijing Bytedance Network Technology Co., Ltd., Beijing (CN)

(72) Inventors: Yating Lin, Beijing (CN); Peipei Wu, Beijing (CN); Fazhe He, Beijing (CN); Cheng Zhong, Beijing (CN); Xiaoyuan Ma, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/283,708

(22) PCT Filed: Mar. 2, 2022

(86) PCT No.: PCT/CN2022/078841
§ 371 (c)(1),
(2) Date: Sep. 22, 2023

(87) PCT Pub. No.: WO2022/227847
PCT Pub. Date: Nov. 3, 2022

(65) Prior Publication Data
US 2024/0176830 A1    May 30, 2024

(30) Foreign Application Priority Data
Apr. 29, 2021 (CN) .......................... 202110474234.X

(51) Int. Cl.
*G06F 16/9532* (2019.01)
*G06F 16/9538* (2019.01)

(52) U.S. Cl.
CPC ...... *G06F 16/9532* (2019.01); *G06F 16/9538* (2019.01)

(58) Field of Classification Search
CPC ............... G06F 16/248; G06F 16/9538; G06F 16/24578; G06F 16/9535; G06F 40/30; G06N 5/022; G06N 5/02
See application file for complete search history.

(56) References Cited

U.S. PATENT DOCUMENTS

| | | | |
|---|---|---|---|
| 2014/0272817 A1* | 9/2014 | Park .......................... | G09B 5/02 434/127 |
| 2020/0257414 A1 | 8/2020 | Wang | |

FOREIGN PATENT DOCUMENTS

| | | |
|---|---|---|
| CN | 104035958 A | 9/2014 |
| CN | 104102733 A | 10/2014 |

(Continued)

OTHER PUBLICATIONS

International Search Report in PCT/CN2022/078841, mailed May 13, 2022, 3 pages.

(Continued)

*Primary Examiner* — Hau H Hoang
(74) *Attorney, Agent, or Firm* — Astute IP Law Group

(57) ABSTRACT

Provided are a data search processing method and apparatus, an electronic device, and a storage medium. The method includes: receiving a search request that includes an entity keyword attributing to a target category; acquiring dimension information on the target category in at least two dimensions and a multimedia resource set of the entity keyword in each of the at least two dimensions, in which the at least two dimensions includes an entity making dimension and an entity site dimension; and displaying a search result page, in which the search result page includes a first region and a second region, the dimension information in the at least two dimensions is displayed in the first region, the second region including a plurality of predetermined sub-regions, and the multimedia resource set in corresponding (Continued)

one of the at least two dimensions to each predetermined sub-region is displayed in the predetermined sub-region.

20 Claims, 10 Drawing Sheets

(56) References Cited

FOREIGN PATENT DOCUMENTS

| | | |
|---|---|---|
| CN | 104809195 A | 7/2015 |
| CN | 104899276 A | 9/2015 |
| CN | 105389361 A | 3/2016 |
| CN | 109871483 A | 6/2019 |
| CN | 110737840 A | 1/2020 |
| CN | 112199524 A | 1/2021 |
| CN | 113158004 A | 7/2021 |

OTHER PUBLICATIONS

First Office Action and Search Report in CN202110474234.X, mailed Jan. 20, 2023, 9 pages.
Second Office Action in CN202110474234.X, mailed May 19, 2023, 8 pages.
Office Action in CN202110474234.X, mailed Sep. 29, 2023, 6 pages.
Office Action for Chinese Patent Application No. 202110474234.X, mailed Aug. 29, 2024, 17 pages.
Office Action for Chinese Patent Application No. 202110474234.X, mailed Jun. 18, 2024, 18 pages.

* cited by examiner

DATA SEARCH PROCESSING METHOD AND APPARATUS, ELECTRONIC DEVICE, AND STORAGE MEDIUM

CROSS-REFERENCE TO RELATED APPLICATION

This is a national stage application filed under 37 U.S.C. 371 of International Patent Application No. PCT/CN2022/078841, filed Mar. 2, 2022, which claims the priority of the Chinese patent application filed on Apr. 29, 2021 with the application number of 202110474234.X and the title of "DATA SEARCH PROCESSING METHOD AND APPARATUS, ELECTRONIC DEVICE, AND STORAGE MEDIUM", the disclosures of which are incorporated herein by reference in their entireties.

FIELD

The present disclosure relates to the technical field of information, in particular to a data search processing method and apparatus, an electronic device, and a storage medium.

BACKGROUND

With the continuous development of computer technologies, users can search multimedia information in which they are interested in a search engine.

For example, a user can input a search keyword into the search engine, and further, the search engine can present multimedia information related to the keyword.

However, with the increasing requirements of users, search results displayed by the search engine cannot satisfy multi-dimensional requirements of the users.

SUMMARY

In order to solve the above-mentioned technical problems or at least partially solve the above-mentioned technical problems, embodiments of the present disclosure provide a data search processing method and apparatus, an electronic device, and a storage medium, which can satisfy multi-dimensional search requirements of a user, improve search precision and increase the information acquisition efficiency of the user.

An embodiment of the present disclosure provides a data search processing method. The method includes: receiving a search request, in which the search request includes an entity keyword attributing to a target category; acquiring dimension information on the target category in at least two dimensions and a multimedia resource set of the entity keyword in each of the at least two dimensions, in which the at least two dimensions includes an entity making dimension and an entity site dimension; and displaying a search result page, in which the search result page includes a first region and a second region, the dimension information in the at least two dimensions are displayed in the first region, the second region includes a plurality of predetermined sub-regions, and the multimedia resource set in corresponding one of the at least two dimensions to each predetermined sub-region is displayed in the predetermined sub-region.

An embodiment of the present disclosure further provides a data search processing apparatus. The data search processing apparatus includes: a receiving module configured to receive a search request, in which the search request includes an entity keyword attributing to a target category; an acquisition module configured to acquire dimension information on the target category in at least two dimensions and a multimedia resource set of the entity keyword in each of the at least two dimensions, in which the at least two dimensions includes an entity making dimension and an entity site dimension; and a display module configured to display a search result page, in which the search result page includes a first region and a second region, the dimension information in the at least two dimensions is displayed in the first region, the second region includes a plurality of predetermined sub-regions, and the multimedia resource set in corresponding one of the at least two dimensions to each predetermined sub-region is displayed in the predetermined sub-region.

An embodiment of the present disclosure further provides an electronic device including one or more processors, and a memory configured to store one or more programs. The one or more programs, when executed by the one or more processors, cause the one or more processors to implement the data search processing method mentioned above.

An embodiment of the present disclosure further provides a computer-readable storage medium, having a computer program stored thereon. The computer program, when executed by a processor, implements the data search processing method mentioned above.

An embodiment of the present disclosure further provides a computer program product including a computer program or an instruction. The computer program or the instruction, when executed by a processor, implements the data search processing method mentioned above.

Compared with the prior art, the technical solutions according to the embodiments of the present disclosure at least have the following advantages. With the data search processing method according to the embodiments of the present disclosure, when the search request is received, the dimension information on the target category to which the entity keyword included in the search request attributes in the at least two dimensions and the multimedia resource set of the entity keyword in each of the at least two dimensions are acquired; when a search result is displayed, the dimension information in the at least two dimensions is displayed in the first region of the search result page, and the multimedia resource set in corresponding one of the at least two dimensions to each predetermined sub-region is displayed in the second region of the search result page; and thus, the search and display of multi-dimensional information are implemented, and the purposes of satisfying multi-dimensional search requirements of a user, improving search precision and increasing the information acquisition efficiency of the user are achieved.

BRIEF DESCRIPTION OF THE DRAWINGS

The above-mentioned and other features, advantages and aspects of embodiments of the present disclosure will become more apparent in conjunction with the accompanying drawings and with reference to the following specific implementations. In the accompanying drawings, same or similar numerals in the accompanying drawings represent the same or similar elements. It should be understood that the accompanying drawings are schematic, and components and elements are not necessarily drawn in proportion.

DESCRIPTION OF EMBODIMENTS

Figure 1:
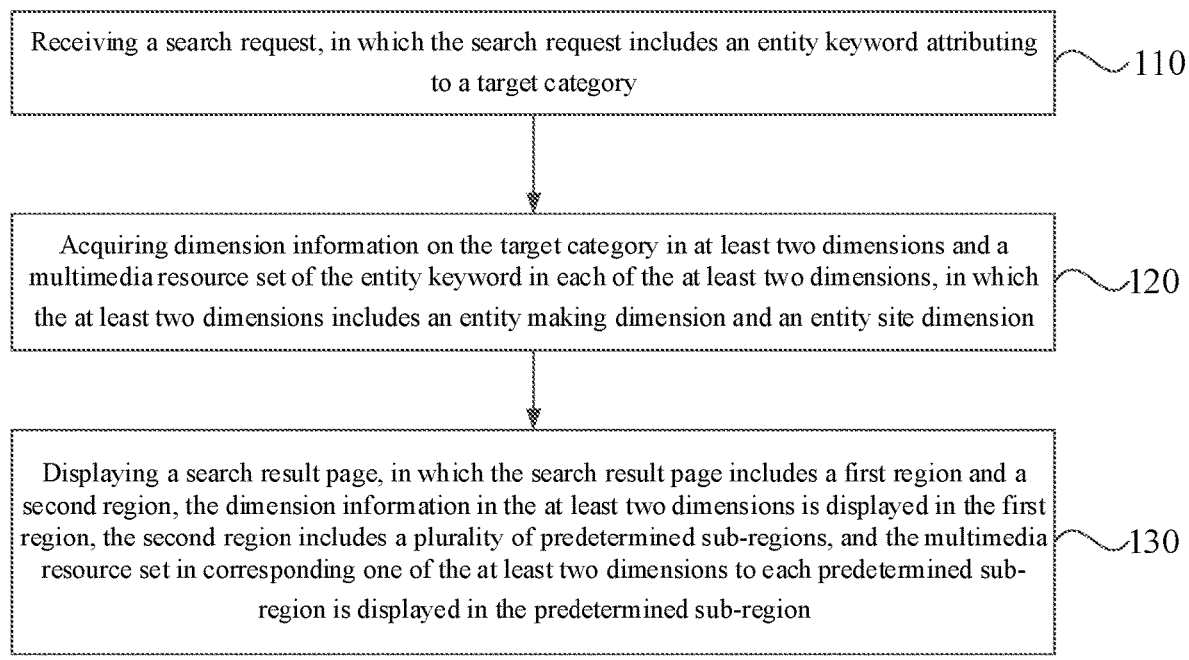
FIG. 1 is a flow chart of a data search processing method in an embodiment of the present disclosure.

Embodiments of the present disclosure will be described below in more detail with reference to the accompanying drawings. Some embodiments of the present disclosure are shown in the accompanying drawings, however, it should be understood that the present disclosure may be implemented in various forms, and should not be explained to be limited to the embodiments described herein, and conversely, these embodiments are provided for understanding the present disclosure more thoroughly and completely. It should be understood that the accompanying drawings and embodiments of the present disclosure are only intended to achieve an exemplary purpose, rather than to limit the protection scope of the present disclosure.

It should be understood that various steps recorded in implementations of the method in the present disclosure may be performed based on different orders and/or concurrently. In addition, the implementations of the method may include additional steps and/or omit the execution of the shown steps. The scope of the present disclosure is not limited in this aspect.

The term "including" and variants thereof used herein are interpreted as open inclusion, i.e., "including, but not limited to." The term "based on" is "at least partially based on." The term "one embodiment" represents "at least one embodiment;" the term "another embodiment" represents "at least one another embodiment;" and the term "some embodiments" represents "at least some embodiments." Relevant definitions of other terms will be given in the following description.

It should be noted that concepts such as "first" and "second" mentioned in the present disclosure are only intended to distinguish different devices, modules or units, rather than to limit an order of functions executed by these devices, modules or units or an interdependence therebetween.

It should be noted that modifications of "one" and "a plurality of" mentioned in the present disclosure are schematic rather than restrictive. It should be understood by the skilled in the art that they should be understood as "one or more" unless explicitly indicated in the context.

Names of messages or information interacted among a plurality of devices in the implementations of the present disclosure are only for illustrative purposes, but are not intended to limit ranges of these messages or information.

Before the data search processing method according to an embodiment of the present disclosure is introduced, "dimension" involved therein is described in conjunction with application scenarios. In an example, a user inputs a search word into a search box of a search engine (the search word usually includes an entity keyword, for example, when the search word is "spicy diced chicken with peanuts," the corresponding entity keyword is "spicy diced chicken with peanuts;" and when the search word is "hair dyeing," the corresponding entity keyword is "hair dyeing"). When the user only inputs "spicy diced chicken with peanuts," a search requirement of the user may be to search for a making method of "spicy diced chicken with peanuts," detailed introduction for skills in making "spicy diced chicken with peanuts," or a nearby restaurant where the made "spicy diced chicken with peanuts" is delicious; a search result that the user wants to get may be displayed in a form of a video or a combination of pictures and texts, etc.; and the user may also pay attention to the professionalism of a publisher of the video (it is determined whether the publisher is a professional chef or a gourmet, etc.). The above-mentioned various requirements of the user can be understood as search requirements in different dimensions. In order to satisfy the search requirements of the user in different dimensions, provided is the data search processing method according to the embodiments of the present disclosure, which aims at satisfying the search requirements of the user in different dimensions, highlighting user's concerns to help the user effectively filter and locate a target, and improving the search precision, thereby increasing the information acquisition efficiency of the user, and improving the use experience of the user.

In one embodiment, as shown in FIG. 1, provided is a flow chart of a data search processing method. This method may be performed by a data search processing apparatus. This apparatus may be implemented in a way of software and/or hardware, and this apparatus may be configured in an electronic device such as a terminal which includes, but is not limited to a smartphone, a handheld computer, a tablet computer, a wearable device with a display screen, a desktop computer, a notebook computer, an all-in-one machine, and a smart home device.

As shown in FIG. 1, this method may include operations at blocks 101 to 130.

At block 101, a search request is received. The search request includes an entity keyword attributing to a target category.

In an example, the search request may be a search word input into a search engine by a user and an associated request received by a terminal when a search operation is triggered. Attribute dimensions of the target category at least include an entity making dimension and an entity site dimension, for example, they may include food, beauty makeup or handcraft, etc., and the food, the beauty makeup and the handcraft may be made at home or consumed in stores. When the target category is the delicious food, the entity keyword attributing to the delicious food may be, for example, "spicy diced chicken with peanuts," "poached spicy slices of pork," or "spicy hot pot." When the target category is the beauty makeup, the entity keyword attributing to the beauty makeup may be "hair dyeing," "hair plaiting" or "eyebrow shaping," etc. When the target category is the handcraft, the entity keyword attributing to the handcraft may be, for example, "origami" or "graffiti."

At block 102, dimension information on the target category in at least two dimensions and a multimedia resource set of the entity keyword in each of the at least two dimensions are acquired. The at least two dimensions includes an entity making dimension and an entity site dimension.

With the target category being the food as an example, the entity making dimension in at least two dimensions corresponding to the food may be a dimension on a making method for the food, for example, when the entity keyword is "spicy diced chicken with peanuts," dimension information in the entity making dimension may be various making methods for "spicy diced chicken with peanuts;" and the entity site dimension in at least two dimensions corresponding to the food may be a dimension on a food making site, for example, when the entity keyword is "spicy diced chicken with peanuts," dimension information in the entity site dimension may include information on restaurants where "spicy diced chicken with peanuts" is relatively delicious. The multimedia resource set includes a plurality of multimedia resources, and each of the multimedia resources may be a multimedia content, i.e., multimedia, or preview information related to the multimedia content. The preview information is, for example, an identifier picture which may be a cover picture of the multimedia content or a picture of a key frame; and the preview information may also be, for example, identifier information related to a publisher of the multimedia content.

In an implementation, with the target category being the food and the entity keyword being "spicy diced chicken with peanuts" as an example, the multimedia resource set in the entity making dimension may be various multimedia resources on the making method for "spicy diced chicken with peanuts," such as videos for explaining steps and skills of the making method for "spicy diced chicken with peanuts," or a mixture of pictures and texts, or a mixture of videos, pictures and texts, etc., which may also include a page view, the number of likes, the number of reposts of multimedia resource and relevant information of a publisher (such as information for determining whether the publisher is a professional chef or a gourmet, etc.). The multimedia resource set in the entity site dimension may be videos or pictures of "spicy diced chicken with peanuts" made in each restaurant, or may also be address information, reservation information, etc. of each restaurant where the dish "spicy diced chicken with peanuts" is provided. It can be understood that each restaurant is usually a restaurant closer to a position where the current user is located.

In an implementation, with the target category being the beauty makeup and the entity keyword being "hair dyeing" as an example, the multimedia resource set in the entity making dimension may be various multimedia resources on steps and skills of "hair dyeing" during hair dyeing at home, such as videos for explaining steps and skills of "hair dyeing," or a mixture of pictures and texts, or a mixture of videos, pictures and texts, etc. The multimedia resource set in the entity site dimension may be "hair dyeing" videos or pictures sent to clients by hairdressers from each hair salon, or may also be address information, reservation information, etc. of each hair salon. It can be understood that each hair salon is usually a hair salon closer to a position where the current user is located so as to provide convenience for the user to enter the hair salon.

At block 103, a search result page is displayed. The search result page includes a first region and a second region, the dimension information in the at least two dimensions is displayed in the first region, the second region includes a plurality of predetermined sub-regions, and the multimedia resource set in corresponding one of the at least two dimensions to each predetermined sub-region is displayed in the predetermined sub-region.

Figure 2:
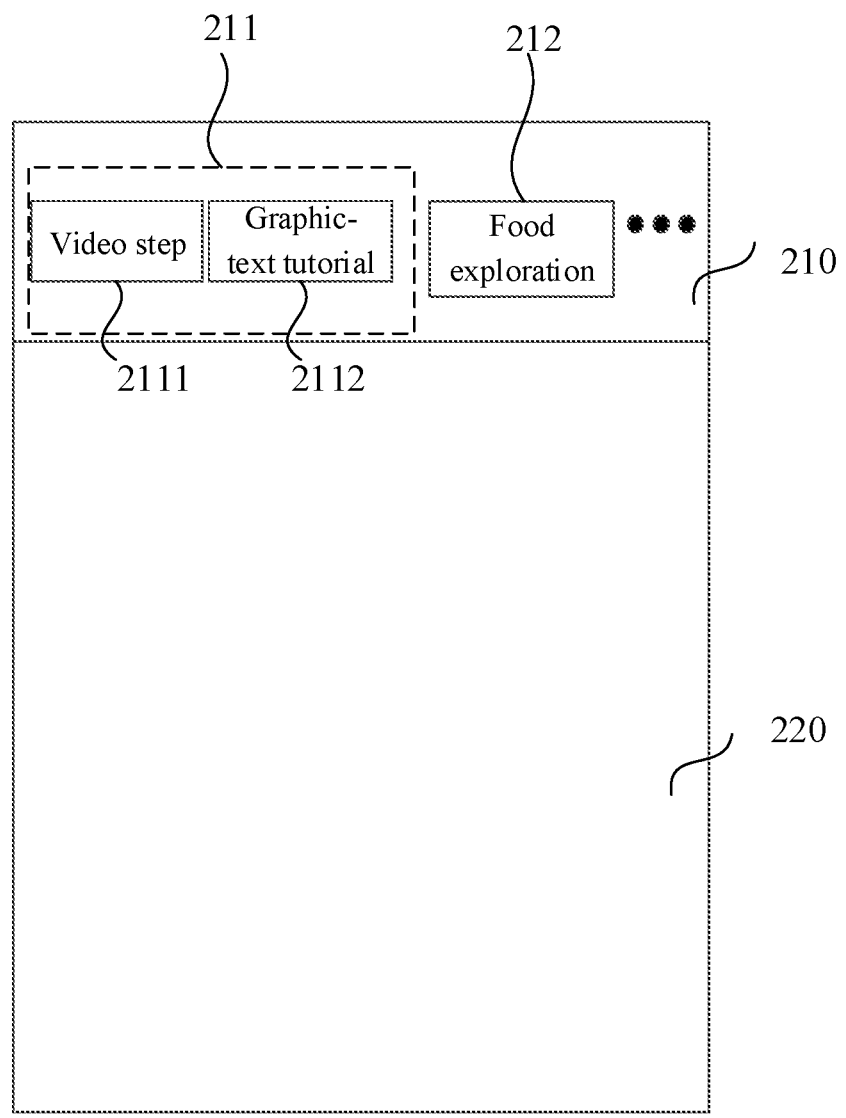
FIG. 2 is a schematic diagram of a search result page in an embodiment of the present disclosure.

In an implementation, with reference to a schematic diagram of a search result page as shown in FIG. 2, the search result page includes a first region 210 and a second region 220, and the dimension information in the at least two dimensions is displayed in the first region 210. In FIG. 2, with the entity keyword being "poached spicy slices of pork" as an example, dimension information "steps of a making method" 211 corresponding to the entity making dimension and dimension information "food exploration" 212 corresponding to the entity site dimension are respectively displayed in the first region 210. The "steps of a making method" 211 may be further detailed as a "video step" 2111 or a "graphic-text tutorial" 2112, etc., wherein the "video step" 2111 means that steps of making "poached spicy slices of pork" or relevant dishes by means of videos, and when a user clicks on the "video step" 2111, the steps of making "poached spicy slices of pork" or relevant dishes by means of videos may be seen; and the "graphic-text tutorial" 2112 means that the steps of the making method of "poached spicy slices of pork" or relevant dishes may be presented in a form of mixing pictures and texts, and when a user clicks on the "graphic-text tutorial" 2112, the steps of the making method of "poached spicy slices of pork" or relevant dishes may be presented in a form of mixing pictures and texts may be seen.

Figure 3:
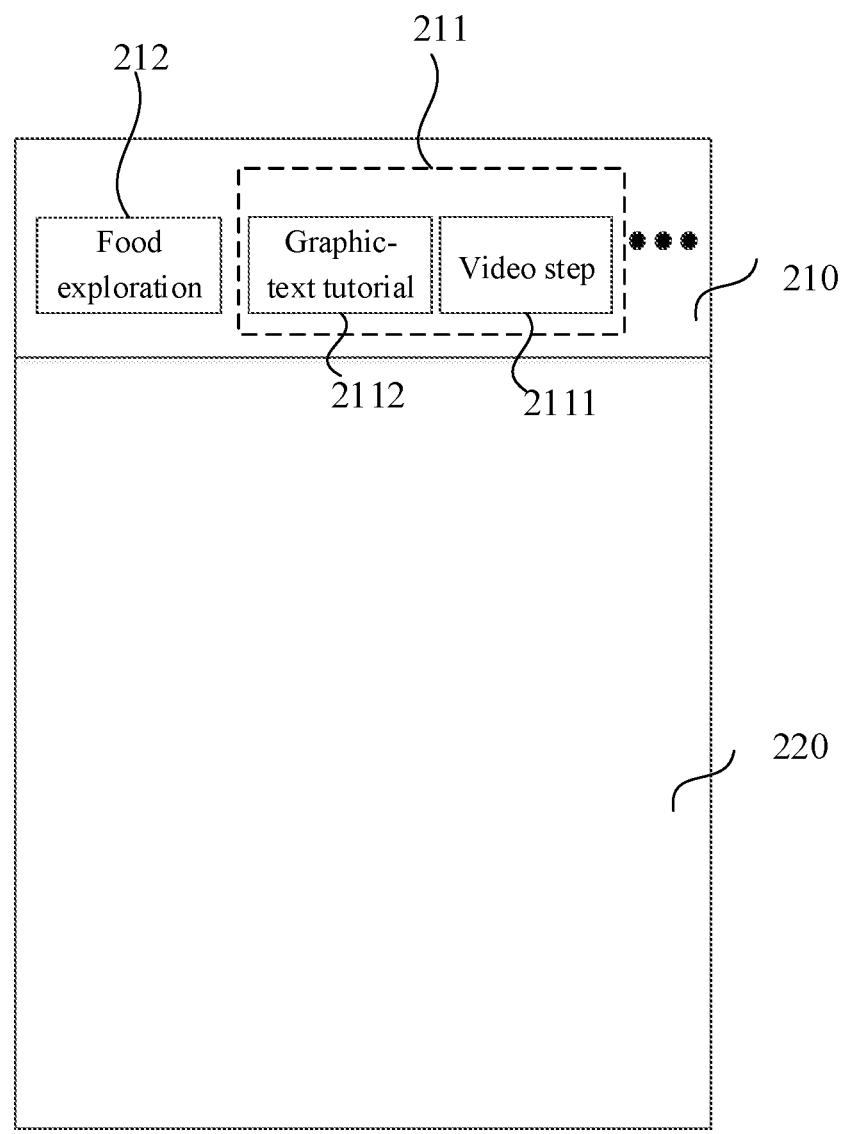
FIG. 3 is a schematic diagram of a search result page in an embodiment of the present disclosure.

In an implementation, the "steps of a making method" 211 and the "food exploration" 212 may be sequentially displayed from left to right in the first region 210, as shown in FIG. 2. Further, when food (such as "poached spicy slices of pork") corresponding to the entity keyword may be easily made at home and the required food materials may be more easily prepared, the "steps of a making method" 211 may be displayed on the left of the "food exploration" 212, that is, the "steps of a making method" 211 is preferentially displayed, and then, the "food exploration" 212 is displayed, as shown in FIG. 2. When food (such as "spicy hot pot") corresponding to the entity keyword is not easily made at home or the required food materials are relatively difficult to prepare, and the dish may be only enjoyed in a restaurant, the "steps of a making method" 211 may be displayed on the right of the "food exploration" 212, that is, the "food exploration" 212 is preferentially displayed, and then, the "steps of a making method" 211 is displayed, as shown in FIG. 3. By preferentially displaying, based on an attribute feature of an entity keyword in a specific dimension, the dimension information to which a user may pay more attention, the efficiency that the user acquires desired information can be increased, and the purpose of satisfying multi-dimensional search requirements of the user can be achieved.

Figure 4:
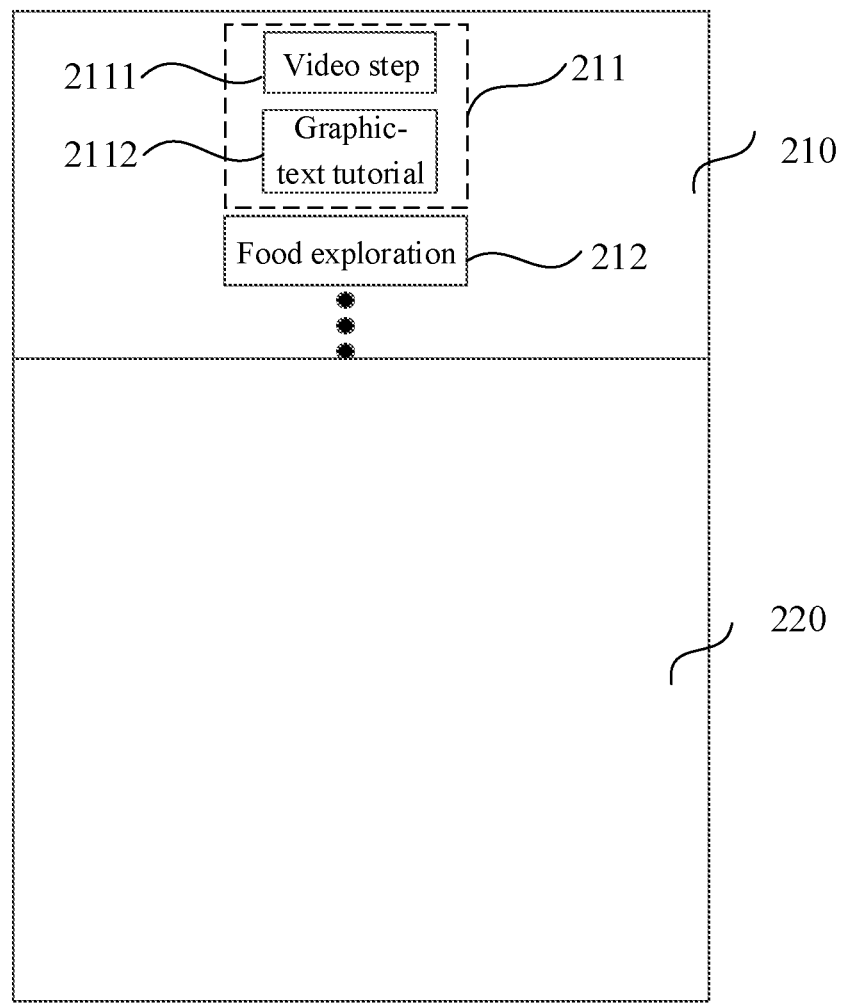
FIG. 4 is a schematic diagram of a search result page in an embodiment of the present disclosure.
Figure 5:
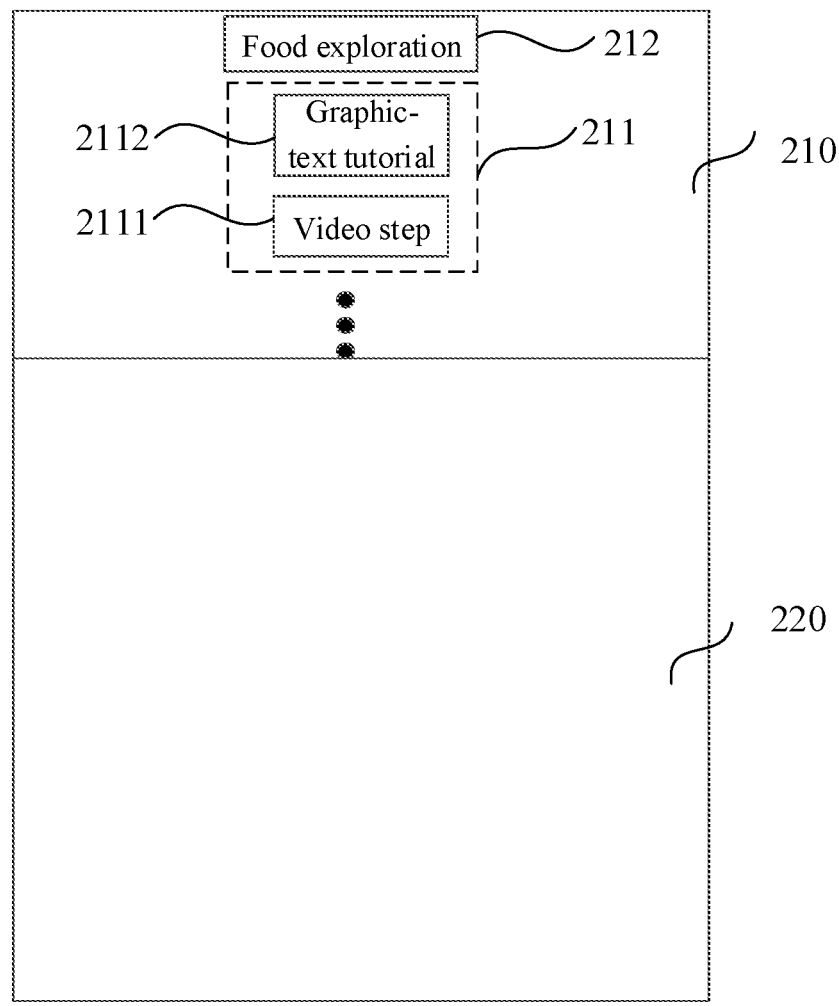
FIG. 5 is a schematic diagram of a search result page in an embodiment of the present disclosure.

In another implementation, the "steps of a making method" 211 and the "food exploration" 212 may also be sequentially displayed from top to bottom in the first region 210, as shown in FIG. 4. Further, when food (such as "poached spicy slices of pork") corresponding to the entity keyword may be easily made at home and the required food materials may be more easily prepared, the "steps of a making method" 211 may be displayed above the "food exploration" 212, that is, the "steps of a making method" 211 is preferentially displayed, and then, the "food exploration" 212 is displayed, as shown in FIG. 4. When food (such as "spicy hot pot") corresponding to the entity keyword is not easily made at home or the required food materials are relatively difficult to prepare, and the dish may be only enjoyed in a restaurant, the "steps of a making method" 211 may be displayed below the "food exploration" 212, that is, the "food exploration" 212 is preferentially displayed, and then, the "steps of a making method" 211 is displayed, as shown in FIG. 5. By preferentially displaying, based on an attribute of an entity keyword in a specific dimension, the dimension information to which a user may pay more attention, the efficiency that the user acquires desired information can be increased, and the purpose of satisfying multi-dimensional search requirements of the user can be achieved.

Further, for an application scenario that the "steps of a making method" 211 is further detailed as the "video step" 2111 or the "graphic-text tutorial" 2112, a displaying position of the "video step" 2111 or the "graphic-text tutorial" 2112 may be adjusted based on a network access way of the current user. For example, when the current user accesses the network by means of a wireless network wifi, the "video step" 2111 may be displayed on the left (as shown in FIG. 2) of or above (as shown in FIG. 4) the "graphic-text tutorial" 2112, so that the user preferentially captures the "video step" 2111, and then call relevant videos by a click-on operation; and when the current user accesses the network by means of a data traffic, the "graphic-text tutorial" 2112 may be displayed on the left (as shown in FIG. 3) of or above (as shown in FIG. 5) of the "video step" 2111, as shown in FIG. 3, or it may also be based on a historical browsing habit of the user, when the user prefers to browse graphic-text information, the "graphic-text tutorial" 2112 is displayed on the left of or above of the "video step" 2111; and when the user prefers to browse video information, the "video step" 2111 is displayed on the left of or above the "graphic-text tutorial" 2112, so that user's multi-dimensional requirements for acquiring information are satisfied to the maximum extent.

Figure 6:
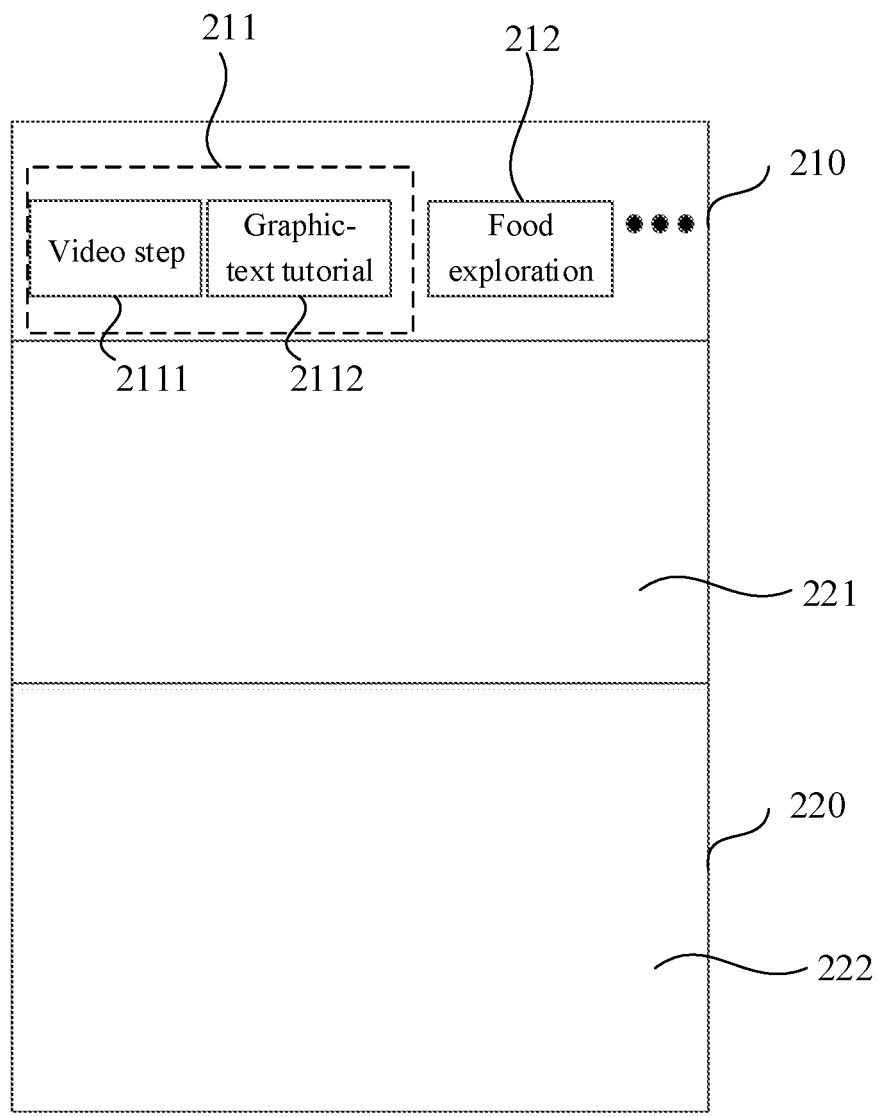
FIG. 6 is a schematic diagram of a search result page in an embodiment of the present disclosure.

In an implementation, the second region 220 includes a plurality of predetermined sub-regions, as shown in FIG. 6, the plurality of predetermined sub-regions is divided into a first predetermined sub-region 221 and a second predetermined sub-region 222, and the first predetermined sub-region 221 and the second predetermined sub-region 222 are sequentially displayed in the second region 220, that is, the first predetermined sub-region 221 is displayed above the second predetermined sub-region 222. The corresponding one of the at least two dimensions to each of the first predetermined sub-region 221 and the second predetermined sub-region 222 is determined based on an attribute feature of the entity keyword. For example, when the attribute feature of the entity keyword is a first attribute feature, the first predetermined sub-region 221 corresponds to the entity making dimension, and the second predetermined sub-region 222 corresponds to the entity site dimension; and when the attribute feature of the entity keyword is a second attribute feature, the first predetermined sub-region 221 corresponds to the entity site dimension, and the second predetermined sub-region 222 corresponds to the entity making dimension. The first attribute feature may mean a determination whether an operation may be completed at home, and the second attribute feature may mean a determination whether an operation is usually completed in a third-party store, and it is relatively difficult to complete at home. In an example, the above-mentioned first attribute feature and second attribute feature are described with specific application scenarios. For example, when the entity keyword is "braised eggplant," and the dish attributes to a homemade dish and may be easily made at home, it is regarded that the attribute feature of the entity keyword is the first attribute feature. For example, when the entity keyword is "spicy hot pot," usually, the dish is relatively difficult to complete at home, a person has to go to a restaurant to enjoy "spicy hot pot" which is authentic in taste, and therefore, the attribute feature of the entity keyword is regarded as the second attribute feature. For another example, when the entity keyword is "hair dyeing," a "hair dyeing" user may easily dye hair at home, and therefore, the attribute feature of "hair dyeing" may be regarded as the first attribute feature; however, an entity keyword "hair extension" cannot be easily realized at home and needs be only realized in a professional hair salon, and therefore, the attribute feature of "hair extension" may be regarded as the second attribute feature. For an entity keyword which can be easily realized at home, the first predetermined sub-region 221 corresponds to the entity making dimension, the multimedia resource set, which is multimedia resources such as steps, skill analysis and error correction of various making methods, in the entity making dimension is correspondingly displayed in the first predetermined sub-region 221. By displaying the multimedia resource set in the entity making dimension in the first predetermined sub-region 221, a user can more rapidly lock the multimedia resources displayed in the first predetermined sub-region 221, the information acquisition efficiency of the user can be increased, the user is helped to realize entity making at home, and multi-dimensional search requirements of the user are satisfied to the maximum extent. For an entity keyword which cannot be easily realized at home, at the moment, it is more possible that the user wants to search which third-party store can more professionally complete the entity making, and therefore, when the attribute feature of the entity keyword is the second attribute feature, the first predetermined sub-region 221 corresponds to the entity site dimension, and the multimedia resource set in the entity site dimension is preferentially displayed. By highlighting user's concerns, the user is helped to effectively filter and locate target information, the information acquisition efficiency of the user is increased, and the use experience of the user is favorably improved. In conclusion, the dimension corresponding to the first predetermined sub-region 221 is determined based on the attribute feature of the entity keyword, and the multimedia resource set in the corresponding dimension is displayed in the first predetermined sub-region 221, so that the purpose of highlighting user's concerns to help the user effectively filter and locate the target information is achieved.

With the data search processing method according to the embodiments of the present disclosure, the dimension information on the target category in at least two dimensions and the multimedia resource set in each of the at least two dimensions are acquired based on the target category which is included in the search request and to which the entity keyword attributes, the multimedia resource set is displayed in conjunction with the attribute feature corresponding to the entity keyword, and the determined multimedia resource set to which the user pays more attention is displayed before the search result, so that the user can more rapidly capture the desired multimedia resource set, the purpose of multi-dimensionally helping the user effectively locate and filter information is achieved, the information search efficiency of the user can be favorably increased, multi-dimensional search requirements of the user can be satisfied, and the experience of the user can be favorably improved.

Figure 7:
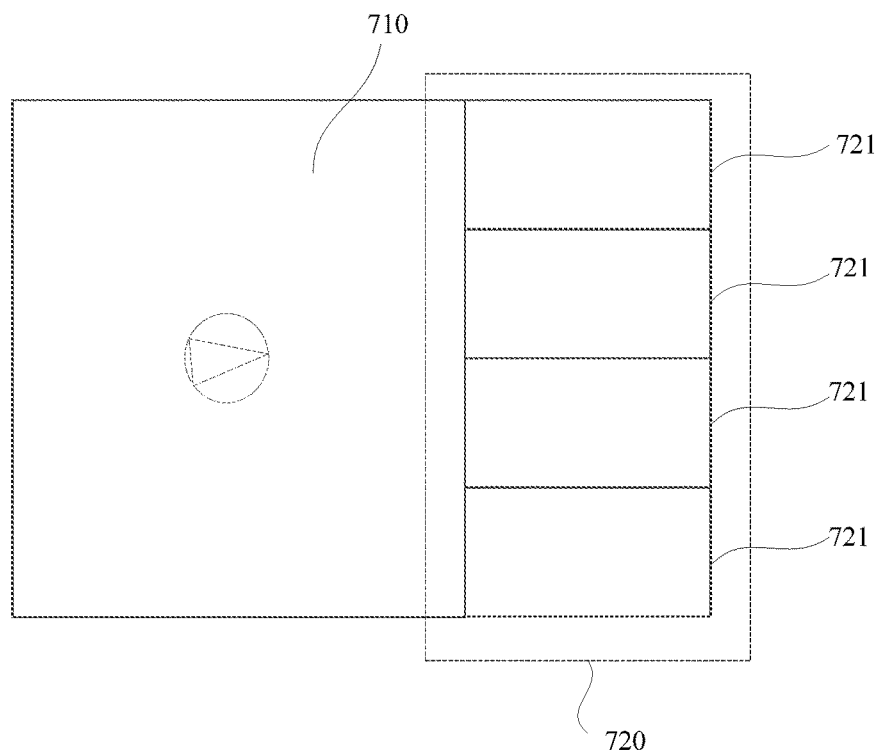
FIG. 7 is a schematic diagram of an interface of a predetermined sub-region in an embodiment of the present disclosure.
Figure 8:
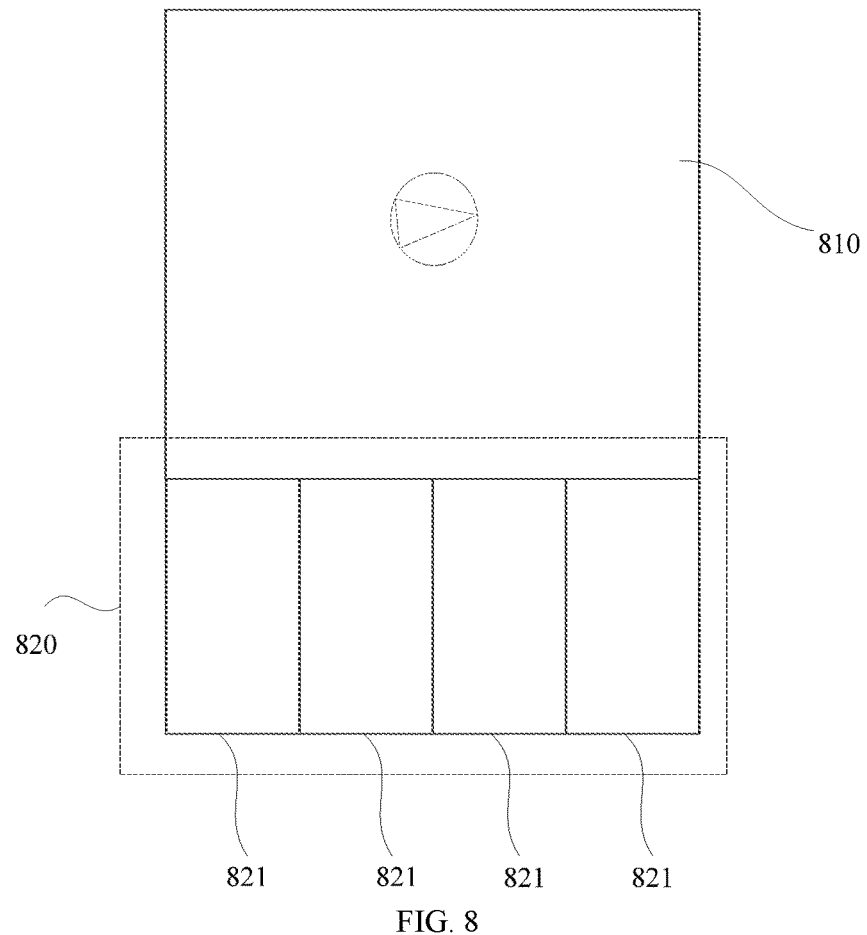
FIG. 8 is a schematic diagram of an interface of a predetermined sub-region in an embodiment of the present disclosure.

Based on the above-mentioned embodiment, there is a feasible implementation: one of the plurality of predetermined sub-regions corresponds to the entity making dimension (as shown in FIG. 6, it is possible that the first predetermined sub-region 221 corresponds to the entity making dimension, or the second predetermined sub-region 222 corresponds to the entity making dimension), and the multimedia resource set includes a video and a plurality of key pictures corresponding to the video, wherein the key pictures may be a product picture corresponding to each making step, for example, when a first step is to cut ingredients (shredded scallion, shredded ginger and shredded green pepper), key pictures corresponding to the first step may be pictures of the cut ingredients. In order to enhance a visual effect, reflect the richness of a search result and strictly control the picture qualities of the key pictures, a filter processing operation may be further added, so that the key pictures presented for the user have better visual effects. In an example, pictures for food can greatly arouse people's appetite, thereby attracting the user to consume the searched multimedia resources for a long time. Further, with reference to a schematic diagram of an interface of a predetermined sub-region as shown in FIG. 7, the predetermined sub-region includes a first part 710 and a second part 720, the first part 710 contains the video (usually, a cover picture of the video is displayed, and the cover picture of the video may be a picture of a finished product, such as a picture of a finished product of a food or a picture of dyed hair or a picture of extended hair, etc.), the second part 720 contains the plurality of key pictures 721 corresponding to the video, and the first part 710 and the second part 720 have the same size in a predetermined direction. With FIG. 7 as an example, the predetermined direction is a longitudinal direction, that is, the first part 710 and the second part 720 have the same height, and the first part 710 and the second part 720 are in a left-right positional relationship. In another implementation, with reference to a schematic diagram of an interface of a predetermined sub-region as shown in FIG. 8, the predetermined sub-region includes a first part 810 and a second part 820, the first part 810 contains the video, the second part 820 contains the plurality of key pictures 821 corresponding to the video, and the first part 810 and the second part 820 have the same size in a predetermined direction. With FIG. 8 as an example, the predetermined direction is a transverse direction, that is, the first part 810 and the second part 820 have the same width, and the first part 810 and the second part 820 are in an up-down positional relationship.

Further, the data search processing method according to the embodiments of the present disclosure further includes: playing, in response to an operation instruction for the key pictures, the video from a frame, corresponding to the key pictures, of the video. With reference to the schematic diagram of the interface of the predetermined sub-region as shown in FIG. 7, the first part 710 is provided with a player, and after a user clicks on a certain key picture 821 in the second part 720, the video is played from a video frame, corresponding to the clicked key picture, of the video in the first part 710. In another implementation, after a user clicks on a certain key picture in the second part 720, a played page is displayed, that is, the search result page is updated as the played page, and the played page is played from the video frame, corresponding to the clicked key picture, of the video. By playing the video from the frame corresponding to the key picture clicked by the user, the time can be saved for the user, and the user can more rapidly view a video content in a playing progress desired by the user, does not need to view from the beginning of the video, but can directly skip to a target progress.

Further, the data search processing method according to the embodiments of the present disclosure further includes: controlling, in response to a slide instruction for the plurality of key pictures (such as the key pictures 721 in FIG. 7), the plurality of key pictures 721 to move in the second part 720 in a direction corresponding to the slide instruction. For example, when a user upwards slides the key pictures 721, the plurality of key pictures 721 upwards move, the key pictures 721 which have been displayed in the second part 720 gradually exit a screen, and the rear key pictures 721 which are not displayed are sequentially displayed in the second part 720, so that all the key pictures can be browsed by the user and can be repeatedly browsed.

Figure 9:
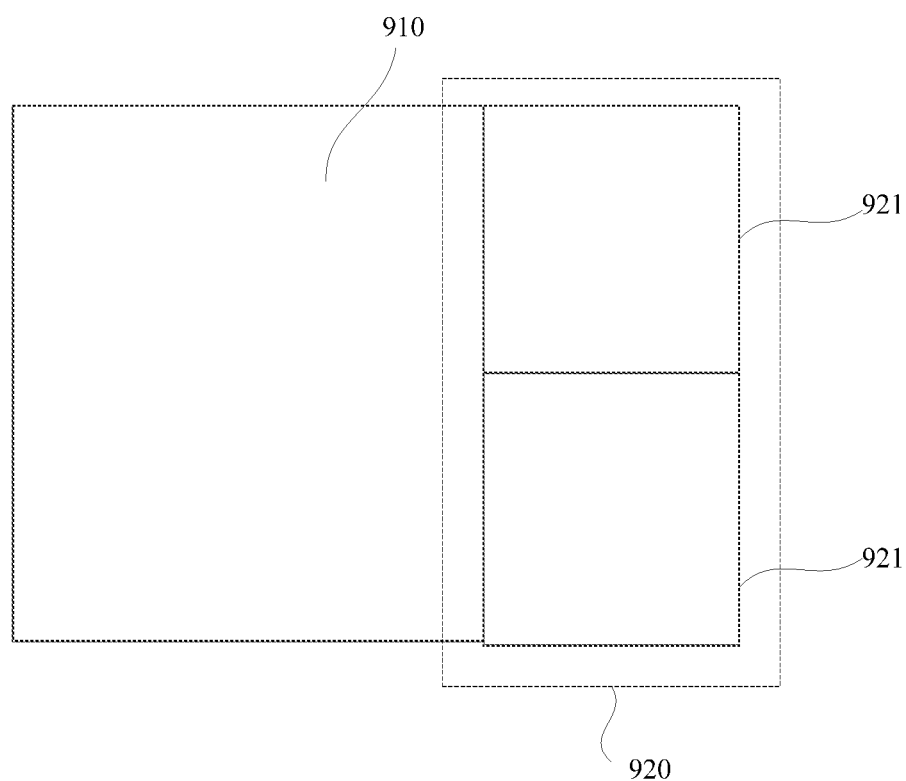
FIG. 9 is a schematic diagram of an interface of a predetermined sub-region in an embodiment of the present disclosure.

Based on the above-mentioned embodiment, there is a feasible implementation: one of predetermined sub-regions corresponds to the entity making dimension, and the multimedia resource set includes a plurality of key pictures of different sizes, that is, the multimedia resource set does not include a video. With reference to a schematic diagram of an interface of a predetermined sub-region as shown in FIG. 9, the predetermined sub-region includes a plurality of parts, each of the plurality of parts includes at least one key picture, and the plurality of parts has the same size in a predetermined direction. For example, FIG. 9 exemplary illustrates three parts which are respectively a fourth part 910 and a fifth part 920, the fourth part 910 includes a key picture, the fifth part 920 includes two key pictures 921, and the fourth part 910 and the fifth part 920 have the same size in the longitudinal direction, that is, they have the same height. The key picture included by the fourth part 910 is usually a picture of a finished product of product, or a main image, for example a search for a piece of cuisine. The key picture included by the fourth part 910 is usually a picture of a finished product of food, i.e., a picture of made food. The key pictures 921 included by the fifth part 920 may be intermediate pictures corresponding to each making step, for example, in a food making scenario, a first making step is to cut ingredients (shredded scallion, shredded ginger and shredded green pepper), and thus, the key pictures corresponding to the first making step may be pictures of cut ingredients. Further, with FIG. 9 as an example, the data search processing method further includes: controlling, in response to a slide instruction for the plurality of key pictures (the key pictures 921 in FIG. 9), the plurality of key pictures 921 to move in the fifth part 920 in a direction corresponding to the slide instruction. For example, when a user upwards slides the key pictures 921, the plurality of key pictures 921 upwards moves, the key pictures 921 which have been displayed in the fifth part 920 gradually exit a screen, and the rear key pictures 921 which are not displayed are sequentially displayed in the fifth part 920, so that all the key pictures can be browsed by the user and can be repeatedly browsed. Further, in some embodiments, the predetermined sub-region may also include three parts, and each part includes one or more pictures.

In an implementation, the multimedia resource set in corresponding one of the at least two dimensions to each predetermined sub-region includes a plurality of multimedia resources. The data search processing method further includes: controlling, in response to a slide operation, the plurality of multimedia resources in the predetermined sub-regions to moves in the predetermined sub-regions. For example, with reference to the schematic diagram of the interface of the predetermined sub-region as shown in FIG. 7, when the user slides any position of the first part 710 or the second part 720 leftwards or rightwards, the multimedia resource which is being displayed moves leftwards or rightwards, and the subsequent multimedia resources which are not displayed move to the predetermined sub-regions so as to be displayed, so that the user can browse more multimedia resources. The multimedia resource default to be displayed in each predetermined sub-region may be a multimedia resource which is related to the entity keyword and has the largest number of likes or the largest page views. The multimedia resource which is related to the entity keyword may be a multimedia resource containing the entity keyword, for example, when the entity keyword is "spicy diced chicken with peanuts," the multimedia resource default to be displayed in each predetermined sub-region may be a home making method for "spicy diced chicken with peanuts;" and when the user slides the predetermined sub-region, the next displayed multimedia resource may be a home making method for "poached spicy slices of pork." In an implementation, with reference to the schematic diagram of the interface of the predetermined sub-region as shown in FIG. 8, when the user slides any position of the first part 810 or the second part 820 upwards or downwards, the multimedia resource which is being displayed moves upwards or downwards, and the subsequent multimedia resources which are not displayed move to the predetermined sub-regions so as to be displayed.

In an implementation, the entity making dimension includes a video-type entity making dimension and a graphic-text-type entity making dimension. The plurality of predetermined sub-regions includes a third predetermined sub-region and a fourth predetermined sub-region. The displaying the multimedia resource set in the corresponding one of the at least two dimensions to each predetermined sub-region in the predetermined sub-region includes: displaying a plurality of videos in the video-type entity making dimension in the third predetermined sub-region; and displaying a plurality of pictures or combinations of the plurality of pictures and videos in the graphic-text-type entity making dimension in the fourth predetermined sub-region. That is, pure-video-type multimedia resources and picture-type multimedia resources are separately displayed, so that a user selectively browses different types of multimedia resources based on the own preference, and user's requirements in a genre dimension are satisfied.

In an implementation, further referring to the schematic diagram of the search result page as shown in FIG. 6, when the first predetermined sub-region 221 corresponds to the entity making dimension, the first predetermined sub-region 221 further includes a third predetermined sub-region and a fourth predetermined sub-region. When the second predetermined sub-region 222 corresponds to the entity making dimension, the second predetermined sub-region 222 further includes a third predetermined sub-region and a fourth predetermined sub-region.

In an implementation, the multimedia resource set in the entity making dimension includes a plurality of first videos. The at least two dimensions further include an entity displaying dimension, a multimedia resource set in the entity displaying dimension includes a plurality of second videos, and each of the plurality of first videos has an aspect ratio different from an aspect ratio of each of the plurality of second videos. Further, in an implementation, the multimedia resource set in the entity making dimension includes a plurality of third videos corresponding to different sites, and position information of each of the sites is consistent with position information of a terminal initiating the search request. For example, with the entity keyword being "spicy diced chicken with peanuts" as an example, the first videos may be videos including the steps of the making method for "spicy diced chicken with peanuts," and the second videos may be videos which have higher popularity in other video applications and are related to "spicy diced chicken with peanuts," rather than videos of the making method for "spicy diced chicken with peanuts," for example, they are videos for introducing "spicy diced chicken with peanuts" in various places. The popularity of the videos may be evaluated based on dimensions such as the number of likes, page views, the number of reposts or the number of comments of the videos. The third videos may be videos for recommending restaurants where a user can enjoy delicious spicy diced chicken with peanuts to the user and videos for introducing characteristics of spicy diced chicken with peanuts in nearby restaurants, and mainly focus on the delicacy of spicy diced chicken with peanuts. Each of the first videos, the second videos and the third videos contains images of spicy diced chicken with peanuts, which is beautiful in color and luster. By enhancing an image effect, visual impact is brought for the user, and the user's appetite is sufficiently aroused, so that the user browsers more relevant video resources.

In an implementation, the at least two dimensions further include an entity recommendation dimension, a multimedia resource set in the entity recommendation dimension includes multimedia resources corresponding to a plurality of recommended entities, a category of each of the plurality of recommended entities is same as the target category, and the recommended entity is determined based on a historical search request within a predetermined period of time. For example, when the entity keyword is "spicy diced chicken with peanuts," and the corresponding target category is food, the multimedia resource set in the entity recommendation dimension includes making methods for other homemade dishes, such as a making method for "poached spicy slices of pork." The recommended entity is "poached spicy slices of pork" and the entity keyword "spicy diced chicken with peanuts" included in the search request attribute to the same target category, i.e., food. The recommended entity is an entity which is searched by other users for a threshold number of times in a predetermined period of time based on history. Further, when the user clicks on a name or picture of a certain specific multimedia resource corresponding to the recommended entity, which is equivalent to that a clicked name or a name of a clicked picture is searched again as a new entity keyword, a new search result page is displayed based on the data search processing method disclosed in the above-mentioned embodiment, and the new search result page corresponds to the name clicked by the user or the name of the picture clicked by the user, so that the user is promoted to continuously view the multimedia resources to acquire more search results.

Figure 10:
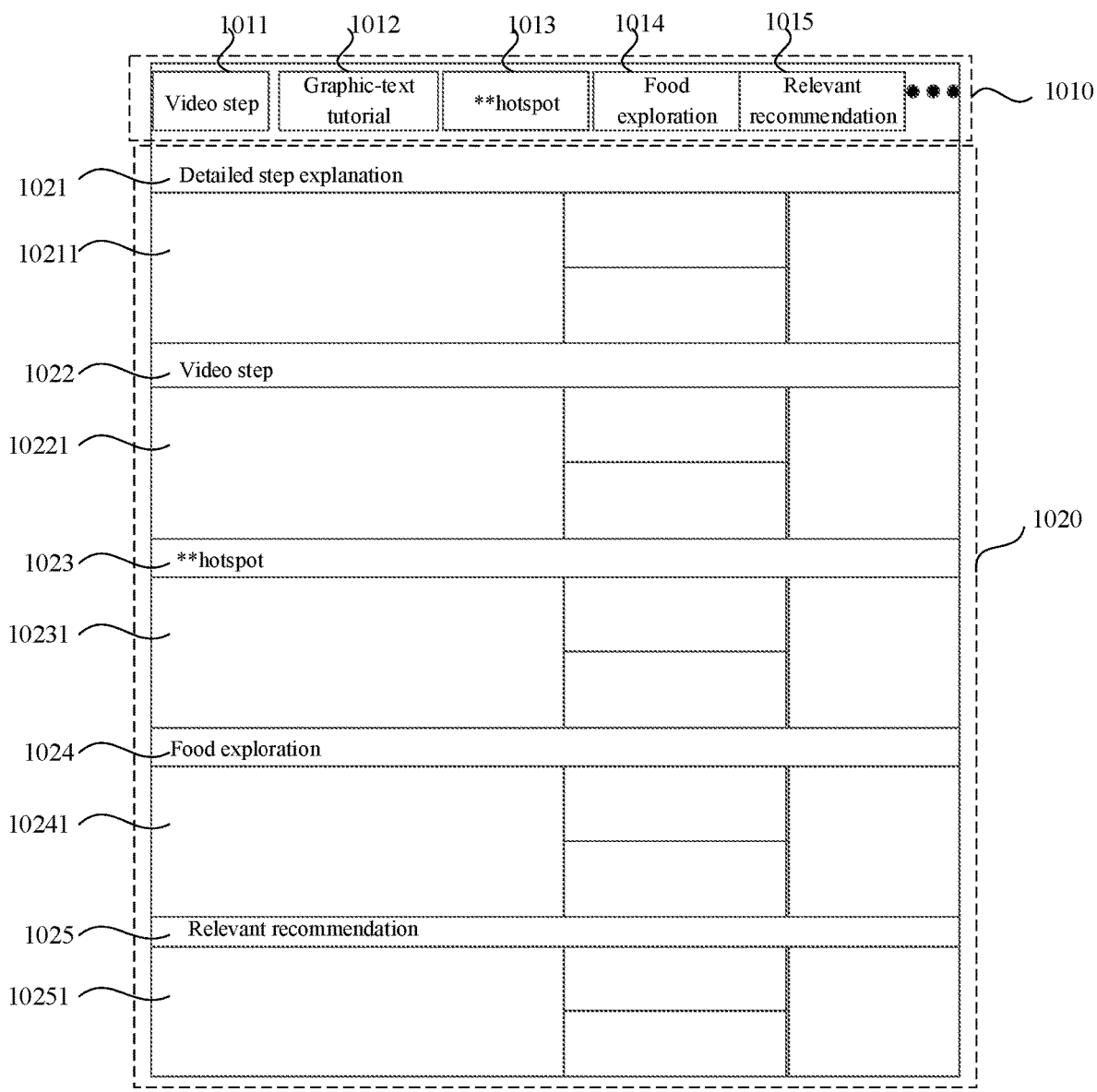
FIG. 10 is a schematic diagram of a search result page in an embodiment of the present disclosure.

In an implementation, the data search processing method further includes: updating the search result page in response to a slide instruction for the search result page, and controlling a position of the first region to be unchanged. Thus, it is ensured that the displayed dimension information in the at least two dimensions in the first region is unchanged, and it is convenient for the user to click on the dimension information to switch multimedia resource sectors. That is, a multimedia resource set in a clicked dimension is only displayed in the second region, or the multimedia resource set in the clicked dimension is displayed on a position close to the front of the second region, so that it is convenient for the user to rapidly acquire the multimedia resources in the corresponding dimensions. With reference to a schematic diagram of a search result page as shown in FIG. 10, the search result page includes a first region 1010 and a second region 1020, and the dimension information in the at least two dimensions is displayed in the first region 1010. In FIG. 10, with the entity keyword being "poached spicy slices of pork" as an example, dimension information "video step" 1011 corresponding to the entity making dimension, "graphic-text tutorial" 1012, dimension information "hotspot" 1013 (wherein  represents other video applications) corresponding to the entity displaying dimension, dimension information "food exploration" 1014 corresponding to the entity site dimension, dimension information "relevant recommendation" 1015 corresponding to the entity recommendation dimension, etc. are respectively displayed in the first region 1010. The user may click on the specific dimension information to switch the multimedia resource set displayed in the second region 1020. For example, when the user clicks on the "video step" 1011, a video of the making method for "poached spicy slices of pork" is only displayed in the second region 1020, or the video of the making method for "poached spicy slices of pork" is displayed on the topmost of the second region 1020. When the user clicks on the "graphic-text tutorial" 1012, a picture of the making method for "poached spicy slices of pork" is only displayed in the second region 1020, or the picture of the making method for "poached spicy slices of pork" is displayed on the topmost of the second region 1020; when the user clicks on the "food exploration" 1014, a recommendation video of a restaurant where the relatively delicious "poached spicy slices of pork" can be made is only displayed in the second region 1020, or the recommendation video is displayed on the topmost of the second region 1020; and when the user clicks on the "relevant recommendation" 1015, a recommendation video of a making method for other homemade dishes, such as a making method for "spicy diced chicken with peanuts," is only displayed in the second region 1020, or the recommendation video is displayed on the topmost of the second region 1020, so that the user finds a multimedia resource in a desired dimension as soon as possible. When the user does not click on the specific dimension information in the first region 1010, the multimedia resource set in each dimension information may be displayed in the second region 1020. Displaying positions of the dimension information "video step" 1011, the "graphic-text tutorial" 1012, the "hotspot" 1013, the "food exploration" 1014 and the "relevant recommendation" 1015 displayed in the first region 1010 are ranked in a certain order, and the multimedia resources in the multimedia resource set in each dimension information displayed in the second region 1020 are also ranked in a certain order. In an example, the order of the dimension information is related to the entity keyword included in the search request and a user attribute. Priorities of the "video step" 1011, the "graphic-text tutorial" 1012 and the "hotspot" 1013 are higher than priorities of the "food exploration" 1014 and the "relevant recommendation" 1015, that is, the "video step" 1011, the "graphic-text tutorial" 1012 and the "hotspot" 1013 may be ranked in front of the "food exploration" 1014 and the "relevant recommendation" 1015. When the user attribute indicates that a network environment of a user terminal is a wifi environment, the "video step" 1011 is ranked in front of the "graphic-text tutorial" 1012; and when the user attribute indicates that a network environment of a user terminal is a mobile traffic, the "graphic-text tutorial" 1012 is ranked in front of the "video step" 1011. Or when the user historically prefers to a video-type resource, the "video step" 1011 is ranked in front of the "graphic-text tutorial" 1012; and when the user historically prefers to a graphic-text-type resource, the "graphic-text tutorial" 1012 is ranked in front of the "video step" 1011. When a dish input by the user attributes to a homemade dish, the "relevant recommendation" 1015 is ranked in front of the "food exploration" 1014; and when a dish input by the user attributes to a dish in a restaurant, rather than a homemade dish, the "food exploration" 1014 is ranked in front of the "relevant recommendation" 1015, so that the search requirements of the user are satisfied to the maximum extent, and the multi-dimensional search requirements of the user are satisfied. In an implementation, when a dish such as "dishes cooked with diced hot red peppers" input by the user does not attribute to a homemade dish and is usually provided in a restaurant, three pieces of dimension information, i.e., the "hotspot" 1013, the "food exploration" 1014 and the "relevant recommendation" 1015 rather than the "video step" 1011 and the "graphic-text tutorial" 1012 are displayed in the first region 1010. The multimedia resource corresponding to the "food exploration" 1014 is a recommendation video for recommending a nearby restaurant where "dishes cooked with diced hot red peppers" is delicious, which includes restaurant information, address information, information on a picture of a finished product of "dishes cooked with diced hot red peppers," etc. Further, when the user does not click on the specific dimension information displayed in the first region 1010, the multimedia resource set in each dimension is displayed in the second region, and the dimension information, such as detailed step explanation 1021, video step 1022, hotspot 1023, food exploration 1024 and relevant recommendation 1025 in the second region 1020 as shown in FIG. 10, to which the multimedia resource set attributes is relevantly displayed. A multimedia resource set in a detailed step explanation dimension is correspondingly displayed in a region 10211 below the detailed step explanation 1021, a multimedia resource set in a video step dimension is correspondingly displayed in a region 10221 below the video step 1022, a multimedia resource set in a hotspot dimension is correspondingly displayed in a region 10231 below the hotspot 1023, a multimedia resource set in a food exploration dimension is correspondingly displayed in a region 10241 below the food exploration 1024, and a multimedia resource set in a relevant recommendation dimension is correspondingly displayed in a region 10251 below the relevant recommendation 1025. A displaying order of multimedia resources in each dimension information may be determined with reference to the displaying order of dimension information in the first region 1010** so as not to be repeated herein.

In an implementation, a displaying order of multimedia resources of the multimedia resource set in each dimension information may be determined based on a certain rule, for example, the multimedia resources are sorted based on a publication time, the latest published multimedia resource is ranked ahead; or the multimedia resources are sorted based on a page view dimension, and the multimedia resource with the highest page view is ranked ahead. In an example, a displaying order of multimedia resources of the multimedia resource set in the entity making dimension may be determined through a tool (such as a utensil for making food) corresponding to the entity keyword in the multimedia resources, for example, it is determined based on the timeliness of the tool corresponding to the entity keyword. A tool which is more popular currently is, for example, an air fryer, a video resource for making food by using the air fryer may be displayed on a position closer to the front, so that it is convenient for a user to more rapidly acquire the video resource. In an implementation, the displaying the multimedia resource set in the corresponding one of the at least two dimensions to each predetermined sub-region in the predetermined sub-region includes: displaying preview information on a plurality of videos in the entity making dimension in the predetermined sub-region. The preview information includes a tool identifier corresponding to the tool or video frames for displaying the tool. With the tool being the air fryer as an example, the multimedia resource set displayed in each predetermined sub-region includes preview information on videos, and the preview information includes a text of the air fryer and/or a picture of the air fryer, so that a user can clearly determine the video in which the air fryer is used. In an example, the preview information may be a cover of the video, a tag is added on the cover, and the tag may be a text of the "air fryer" or a small picture of the "air fryer." Or one or more video frames of the air fryer included in the video are extracted and displayed in the preview information, so that the user clearly knows that the air fryer is used to make food in the video.

With the data search processing method according to the embodiments of the present disclosure, multimedia resource sets related to a search word (i.e., an entity keyword) input by a user are acquired multi-dimensionally and are respectively displayed based on the dimensions, the user's concerns are highlighted to help the user effectively filter and locate target information, and the visual effect is enhanced, so that the richness of a search result is reflected, the timeliness of utensils used for making food is increased, multi-dimensional requirements of the user are fully considered, and the purpose of satisfying the multi-dimensional search requirements of the user is achieved, and the search precision and the search experience of the user are favorably improved.

Figure 11:
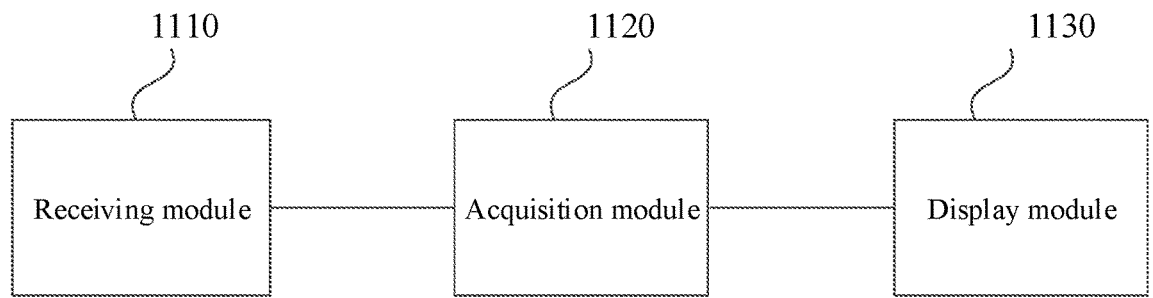
FIG. 11 is a schematic structural diagram of a data search processing apparatus in an embodiment of the present disclosure.

FIG. 11 is a schematic structural diagram of a data search processing apparatus in an embodiment of the present disclosure. The data search processing apparatus according to the embodiments of the present disclosure may be configured in a client or a server. The data search processing apparatus includes: a receiving module 1110 configured to receive a search request, in which the search request includes an entity keyword attributing to a target category; an acquisition module 1120 configured to acquire dimension information on the target category in at least two dimensions and a multimedia resource set of the entity keyword in each of the at least two dimensions, in which the at least two dimensions includes an entity making dimension and an entity site dimension; and a display module 1130 configured to display a search result page, in which the search result page includes a first region and a second region, the dimension information in the at least two dimensions is displayed in the first region, the second region includes a plurality of predetermined sub-regions, and the multimedia resource set in corresponding one of the at least two dimensions to each predetermined sub-region is displayed in the predetermined sub-region.

In some embodiments of the present disclosure, the plurality of predetermined sub-regions includes a first predetermined sub-region and a second predetermined sub-region, the first predetermined sub-region and the second predetermined sub-region are sequentially displayed in the second region, and the corresponding one of the at least two dimensions to each of the first predetermined sub-region and the second predetermined sub-region is determined based on an attribute feature of the entity keyword.

In some embodiments of the present disclosure, when the attribute feature of the entity keyword is a first attribute feature, the first predetermined sub-region corresponds to the entity making dimension, and the second predetermined sub-region corresponds to the entity site dimension; and when the attribute feature of the entity keyword is a second attribute feature, the first predetermined sub-region corresponds to the entity site dimension, and the second predetermined sub-region corresponds to the entity making dimension.

In some embodiments of the present disclosure, one of the plurality of predetermined sub-regions corresponds to the entity making dimension, and the multimedia resource set includes a video and a plurality of key pictures corresponding to the video; and the predetermined sub-region includes a first part and a second part, the first part contains the video, the second part contains the plurality of key pictures corresponds to the video, and the first part and the second part have the same size in a predetermined direction.

In some embodiments of the present disclosure, the method further includes: playing, in response to an operation instruction for the key pictures, the video from a frame, corresponding to the key pictures, of the video.

In some embodiments of the present disclosure, the method further includes controlling, in response to a slide instruction for the plurality of key pictures, the plurality of key pictures to move in the second part in a direction corresponding to the slide instruction.

In some embodiments of the present disclosure, one of the predetermined sub-regions corresponds to the entity making dimension, and the multimedia resource set includes a plurality of key pictures of different sizes. The predetermined sub-region includes a plurality of parts, each of the plurality of parts includes at least one key picture, and the plurality of parts have the same size in a predetermined direction.

In some embodiments of the present disclosure, the multimedia resource set in corresponding one of the at least two dimensions to each predetermined sub-region includes a plurality of multimedia resources. The apparatus further includes a first control module configured to control, in response to a slide operation, the plurality of multimedia resources in the predetermined sub-regions to move in the predetermined sub-regions.

In some embodiments of the present disclosure, the entity making dimension includes a video-type entity making dimension and a graphic-text-type entity making dimension. The display module 1130 is further configured to: display a plurality of videos in the video-type entity making dimension in the third predetermined sub-region; and display a plurality of pictures or combinations of the plurality of pictures and videos in the graphic-text-type entity making dimension in the fourth predetermined sub-region.

In some embodiments of the present disclosure, the multimedia resource set in the entity making dimension includes a plurality of first videos. The at least two dimensions further include an entity displaying dimension. A multimedia resource set in the entity displaying dimension includes a plurality of second videos, and each of the plurality of first videos has an aspect ratio different from an aspect ratio of each of the plurality of second videos.

In some embodiments of the present disclosure, the multimedia resource set in the entity site dimension includes a plurality of third videos corresponding to different sites, and position information of each of the sites is consistent with position information of a terminal initiating the search request.

In some embodiments of the present disclosure, the at least two dimensions further include an entity recommendation dimension, a multimedia resource set in the entity recommendation dimension includes multimedia resources corresponding to a plurality of recommended entities, a category of each of the plurality of recommended entities is same as the target category, and the recommended entity is determined based on a historical search request within a predetermined period of time.

In some embodiments of the present disclosure, the apparatus further includes a second control module configured to update the search result page in response to a slide instruction for the search result page, and control a position of the first region to be unchanged.

In some embodiments of the present disclosure, a displaying order of multimedia resources of the multimedia resource set in the entity making dimension is determined through a tool corresponding to the entity keyword in the multimedia resources.

In some embodiments of the present disclosure, the display module 1130 is further configured to display preview information on a plurality of videos in the entity making dimension in the predetermined sub-region. The preview information includes a tool identifier corresponding to the tool or video frames for displaying the tool.

The data search processing apparatus according to the embodiments of the present disclosure may perform the steps performed by the client or server in the data search processing method provided in the method embodiment of the present disclosure, and specific performing steps and beneficial effects will not be repeated herein.

Figure 12:
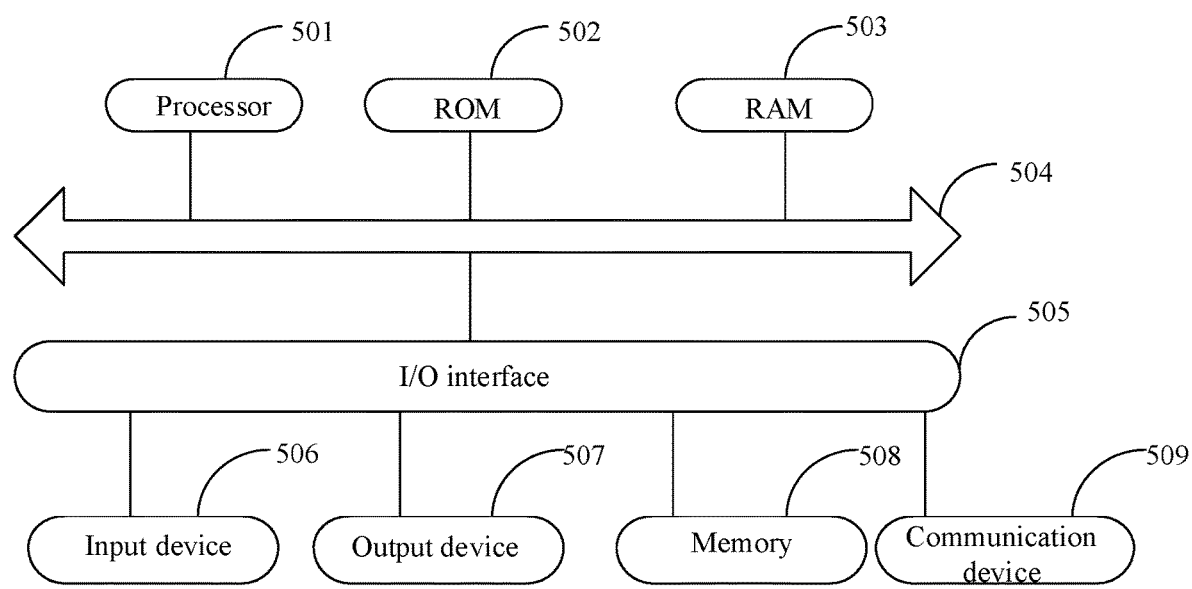
FIG. 12 is a schematic structural diagram of an electronic device in an embodiment of the present disclosure.

FIG. 12 is a schematic structural diagram of an electronic device in an embodiment of the present disclosure. Below, specific reference is made to FIG. 12 which shows a schematic structural diagram of an electronic device 500 in an embodiment of the present disclosure. The electronic device 500 in the embodiment of the present disclosure may include, but is not limited to a mobile terminal such as a mobile phone, a notebook computer, a digital broadcast receiver, a PDA (Personal Digital Assistant), a PAD (Tablet Computer), a PMP (Portable Multimedia Player), a vehicle-mounted terminal (e.g. a vehicle-mounted navigation terminal), and a wearable electronic device, and a fixed terminal such as a digital TV, a desktop computer, and a smart home device. The electronic device shown in FIG. 12 is only an example, and should not bring any limitations on a function and use range of the embodiment of the present disclosure.

As shown in FIG. 12, the electronic device 500 may include a processor (such as a central processing unit and a graphics processing unit) 501 which may perform various appropriate actions and processing based on a program stored in a read-only memory (ROM) 502 or a program loaded from a memory 508 to a random access memory (RAM) 503, so as to implement the method in the embodiment of the present disclosure. In the RAM 503, various programs and data required for operating the electronic device 500 are further stored. The processor 501, the ROM 502 and the RAM 503 are connected to each other by a bus 504. An input/output (I/O) interface 505 is also connected to the bus 504.

Usually, the following devices, including an input device 506 such as a touch screen, a touchpad, a keyboard, a mouse, a camera, a microphone, an accelerometer, and a gyroscope; an output device 507 such as a liquid crystal display (LCD), a loudspeaker, and a vibrator; a memory 508 such as a cassette and a hard disk; and a communication device 509, may be connected to the I/O interface 505. The communication device 509 may allow the electronic device 500 to wirelessly or wired communicate with other devices so as to exchange data. FIG. 12 shows the electronic device 500 provided with various devices, however, it should be understood that it is not required to implement or provide all the shown devices. In an exemplary embodiment, more or fewer devices may be implemented or provided.

According to the embodiment of the present disclosure, the process described as above with reference to the flow chart may be implemented as a computer software program. For example, an embodiment of the present disclosure includes a computer program product which includes a computer program carried on a non-transient computer-readable medium, and this computer program includes a program code for performing the method shown in the flow chart, thereby implementing the above-mentioned method. In such an embodiment, this computer program may be downloaded from a network by the communication device 509 and installed, or installed from the memory 508, or installed from the ROM 502. When this computer program is executed by the processor 501, the above-mentioned functions defined in the method in the embodiment of the present disclosure are executed.

It should be noted that the above-mentioned computer-readable medium in the present disclosure may be a computer-readable signal medium or a computer-readable storage medium or any combinations of the both mentioned as above. The computer-readable storage medium may include, but is not limited to an electronic, magnetic, optical, electromagnetic, infrared or semiconductor system, apparatus or device, or any combinations thereof. A more specific example of the computer-readable storage medium may include, but is not limited to an electric connection having one or more conductive wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device or any appropriate combinations thereof. In the present disclosure, the computer-readable storage medium may be any tangible media including or storing a program which may be used by an instruction execution system, apparatus or device or used in combination with the same. In the present disclosure, the computer-readable signal medium may include a data signal propagating in a baseband or as a part of carrier waves, and bear a computer-readable program code thereon. Such propagating data signal may be in various forms including, but not limited to an electromagnetic signal, an optical signal or any appropriate combinations thereof. The computer-readable signal medium may be further any computer-readable media other than the computer-readable storage medium, and this computer-readable signal medium may send, propagate or transmit the program used by the instruction execution system, apparatus or device or used in combination with the same. The program code included by the computer-readable medium may be transmitted by any appropriate media including, but not limited to a wire, an optical cable, and an RF (Radio Frequency) or any appropriate combinations thereof.

In some implementations, the client or server may communicate by means of any network protocols, such as a HTTP (HyperText Transfer Protocol), which have been known at present or will be researched or developed in the future, and may communicate (such as a communication network) and be interconnected with digital data in any forms or media. Examples of the communication network include a local area network ("LAN"), a wide area network ("WAN"), an Internet network (such as Internet), a peer-to-peer network (such as ad hoc peer-to-peer network), and any networks which have been known at present or will be researched or developed in the future.

The above-mentioned computer-readable medium may be included in the above-mentioned electronic device, and may also exist alone, but is not assembled in this electronic device.

The above-mentioned computer-readable medium carries one or more programs. When the one or more programs are executed by this electronic device, this electronic device is enabled to: receive a search request, in which the search request including an entity keyword attributing to a target category; acquire dimension information on the target category in at least two dimensions and a multimedia resource set of the entity keyword in each of the at least two dimensions, in which the at least two dimensions includes an entity making dimension and an entity site dimension; and display a search result page, in which the search result page includes a first region and a second region, the dimension information in the at least two dimensions is displayed in the first region, the second region includes a plurality of predetermined sub-regions, and the multimedia resource set in corresponding one of the at least two dimensions to each predetermined sub-region is displayed in the predetermined sub-region.

In some embodiments of the present disclosure, when one or more of the above-mentioned programs are executed by the electronic device, the electronic device may further perform other steps in the above-mentioned embodiment.

A computer program code for performing the operation in the present disclosure may be compiled by one or more programming languages which include, but are not limited to object-oriented programming languages, such as Java, Smalltalk, and C++, and further include conventional procedural programming languages, such as "C" languages or similar programming languages. The program code may be completely executed on a user's computer, partially executed on the user's computer, executed as an independent software package, partially executed on the user's computer and partially executed on a remote computer, or completely executed on the remote computer or a server. In a case that the remote computer is involved, the remote computer may be connected to the user's computer via any kind of network including a local area network (LAN) or a wide area network (WAN), or may be connected to an external computer (for example, connected by an Internet service provider by means of the Internet).

The flow charts and block diagrams in the accompanying drawings show possibly-implemented system architectures, functions and operations of the system, method and computer program product according to various embodiments of the present disclosure. In this regard, each block in the flow charts or the block diagrams may represent a part of a module, a program segment or a code, and a part of the module, the program segment or the code includes one or more executable instructions for implementing specified logic functions. It should be also noted that, in some implementations as alternations, functions marked in the blocks may also occur in an order different from an order marked in the accompanying drawings. For example, in fact, two continuous blocks may be performed approximately concurrently, and sometimes, they may also be performed in an opposite order, which depends upon the revolved functions. It should be further noted that each block in the block diagrams and/or the flow charts and combinations of the blocks in the block diagrams and/or the flow charts may be implemented by a special-purpose hardware-based system executing the specified functions or operations, or may be implemented by a combination of special-purpose hardware and a computer instruction.

The units involved in the embodiments of the present disclosure may be implemented in a form of software or hardware. Names of the units do not constitute limitations on the units themselves under some conditions.

The functions described as above in the present disclosure may be at least partially executed by one or more hardware logic components. For example, non-restrictively, exemplary hardware logic components that can be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium which may include or store a program used by an instruction execution system, apparatus or device or used in combination with the instruction execution system, apparatus or device. The machine-readable medium may be a machine-readable signal medium or a machine-readable storage medium. The machine-readable medium may include, but is not limited to an electronic, magnetic, optical, electromagnetic, infrared or semiconductor system, apparatus or device, or any appropriate combinations thereof. A more specific example of the machine-readable storage medium may include an electric connection based on one or more wires, a portable computer disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device or any appropriate combinations thereof.

According to one or more embodiments of the present disclosure, the present disclosure provides a data search processing method including: receiving a search request, in which the search request includes an entity keyword attributing to a target category; acquiring dimension information on the target category in at least two dimensions and a multimedia resource set of the entity keyword in each of the at least two dimensions, in which the at least two dimensions includes an entity making dimension and an entity site dimension; and displaying a search result page, in which the search result page includes a first region and a second region, the dimension information in the at least two dimensions is displayed in the first region, the second region includes a plurality of predetermined sub-regions, and the multimedia resource set in corresponding one of the at least two dimensions to each predetermined sub-region is displayed in the predetermined sub-region.

According to one or more embodiments of the present disclosure, in the data search processing method according to the present disclosure, the plurality of predetermined sub-regions include a first predetermined sub-region and a second predetermined sub-region, the first predetermined sub-region and the second predetermined sub-region are sequentially displayed in the second region, and the corresponding one of the at least two dimensions to each of the first predetermined sub-region and the second predetermined sub-region is determined based on an attribute feature of the entity keyword.

According to one or more embodiments of the present disclosure, in the data search processing method according to the present disclosure, when the attribute feature of the entity keyword is a first attribute feature, the first predetermined sub-region corresponds to the entity making dimension, and the second predetermined sub-region corresponds to the entity site dimension; and when the attribute feature of the entity keyword is a second attribute feature, the first predetermined sub-region corresponds to the entity site dimension, and the second predetermined sub-region corresponds to the entity making dimension.

According to one or more embodiments of the present disclosure, in the data search processing method according to the present disclosure, one of the plurality of predetermined sub-regions corresponds to the entity making dimension, and the multimedia resource set includes a video and a plurality of key pictures corresponding to the video. The predetermined sub-region includes a first part and a second part. The first part contains the video, and the second part contains the plurality of key pictures corresponding to the video. The first part and the second part have the same size in a predetermined direction.

According to one or more embodiments of the present disclosure, in the data search processing method according to the present disclosure, the method further includes: playing the video from a frame, corresponding to the key pictures, of the video in response to an operation instruction for the key pictures.

According to one or more embodiments of the present disclosure, in the data search processing method according to the present disclosure, the method further includes: controlling, in response to a slide instruction for the plurality of key pictures, the plurality of key pictures to move in the second part in a direction corresponding to the slide instruction.

According to one or more embodiments of the present disclosure, in the data search processing method according to the present disclosure, one of the predetermined sub-regions corresponds to the entity making dimension, and the multimedia resource set includes a plurality of key pictures of different sizes. The predetermined sub-region includes a plurality of parts, each of the plurality of parts includes at least one key picture, and the plurality of parts has the same size in a predetermined direction.

According to one or more embodiments of the present disclosure, in the data search processing method according to the present disclosure, the multimedia resource set in corresponding one of the at least two dimensions to each predetermined sub-region includes a plurality of multimedia resources. The method further includes: controlling the plurality of multimedia resources in the predetermined sub-regions in response to a slide operation, to move in the predetermined sub-regions.

According to one or more embodiments of the present disclosure, in the data search processing method according to the present disclosure, the entity making dimension includes a video-type entity making dimension and a graphic-text-type entity making dimension; the plurality of predetermined sub-regions includes a third predetermined sub-region and a fourth predetermined sub-region. The displaying the multimedia resource set in the corresponding one of the at least two dimensions to each predetermined sub-region in the predetermined sub-region includes: displaying a plurality of videos in the video-type entity making dimension in the third predetermined sub-region; and displaying a plurality of pictures or combinations of the plurality of pictures and videos in the graphic-text-type entity making dimension in the fourth predetermined sub-region.

According to one or more embodiments of the present disclosure, in the data search processing method according to the present disclosure, the multimedia resource set in the entity making dimension includes a plurality of first videos; and the at least two dimensions further include an entity displaying dimension, a multimedia resource set in the entity displaying dimension includes a plurality of second videos, each of the plurality of first videos has an aspect ratio different from an aspect ratio of each of the plurality of second videos.

According to one or more embodiments of the present disclosure, in the data search processing method according to the present disclosure, the multimedia resource set in the entity site dimension includes a plurality of third videos corresponding to different sites, and position information of each of the sites is consistent with position information of a terminal initiating the search request.

According to one or more embodiments of the present disclosure, in the data search processing method according to the present disclosure, the at least two dimensions further include an entity recommendation dimension, a multimedia resource set in the entity recommendation dimension includes multimedia resources corresponding to a plurality of recommended entities, a category of each of the plurality of recommended entities is same as the target category, and the recommended entity is determined based on a historical search request within a predetermined period of time.

According to one or more embodiments of the present disclosure, in the data search processing method according to the present disclosure, the method further includes: updating the search result page in response to a slide instruction for the search result page, and controlling a position of the first region to be unchanged.

According to one or more embodiments of the present disclosure, in the data search processing method according to the present disclosure, a displaying order of multimedia resources of the multimedia resource set in the entity making dimension is determined through a tool corresponding to the entity keyword in the multimedia resources.

According to one or more embodiments of the present disclosure, in the data search processing method according to the present disclosure, the displaying the multimedia resource set in the corresponding one of the at least two dimensions to each predetermined sub-region in the predetermined sub-region includes: displaying preview information on a plurality of videos in the entity making dimension in the predetermined sub-region. The preview information includes a tool identifier corresponding to the tool or video frames for displaying the tool.

According to one or more embodiments of the present disclosure, the present disclosure provides a data search processing apparatus, including: a receiving module configured to receive a search request, in which the search request including an entity keyword attributing to a target category; an acquisition module configured to acquire dimension information on the target category in at least two dimensions and a multimedia resource set of the entity keyword in each of the at least two dimensions, in which the at least two dimensions includes an entity making dimension and an entity site dimension; and a display module configured to display a search result page, in which the search result page includes a first region and a second region, the dimension information in the at least two dimensions is displayed in the first region, the second region includes a plurality of predetermined sub-regions, and the multimedia resource set in corresponding one of the at least two dimensions to each predetermined sub-region is displayed in the predetermined sub-region.

According to one or more embodiments of the present disclosure, the present disclosure provides an electronic device including one or more processors, and a memory configured to store one or more programs. The one or more programs, when executed by the one or more processors, cause the one or more processors to implement any one of the data search processing methods according to the present disclosure.

According to one or more embodiments of the present disclosure, the present disclosure provides a computer-readable storage medium, having a computer program stored thereon. The computer program, when executed by a processor, implements any one of the data search processing methods according to the present disclosure.

An embodiment of the present disclosure further provides a computer program product including a computer program or instruction which, when executed by a processor, implements the data search processing method mentioned above.

Preferred embodiments of the present disclosure and explanation for applied technical principles are only described as above. It should be understood by the skilled in the art that the disclosure scope involved in the present disclosure is not limited to a technical solution formed by a specific combination of the above-mentioned technical features, and shall also include other technical solutions formed by any combinations of the above-mentioned technical features or their equivalent features without departing from the above-mentioned disclosure concept, such as a technical solution formed by mutual replacement between the above-mentioned features and technical features with similar functions disclosed (but is not limited to) in the present disclosure.

In addition, although the operations are described in a specific order, which should not be understood as a requirement that these operations are performed in the shown specific order or a sequential order. In a certain environment, multi-tasking and concurrent processing may be advantageous. Similarly, although the above discussion contains a number of specific implementation details, these details should not be interpreted as limitations on the scope of the present disclosure. Some features described in the context of an individual embodiment may also be implemented in the individual embodiment by combination. Conversely, various features described in the context of a single embodiment may also be implemented in a plurality of embodiments individually or in any appropriate sub-combinations.

The subject matter has been described in language specific to structural features and/or logical actions of the method, however, it should be understood that the subject matter defined in the appended claims is not necessarily limited to the specific features or actions described as above. Conversely, the specific features and actions described as above are only exemplary forms for implementing the claims.

What is claimed is:

1. A data search processing method, comprising:
receiving a search request, the search request comprising an entity keyword attributing to a target category, wherein attribute dimensions of the target category at least comprise an entity making dimension and an entity site dimension;
acquiring dimension information on the target category in the entity making dimension and the entity site dimension and a multimedia resource set of the entity keyword in each of the entity making dimension and the entity site dimension; and
displaying a search result page, the search result page comprising a first region and a second region, the dimension information in the entity making dimension and the entity site dimension being displayed in the first region, the second region comprising a plurality of predetermined sub-regions, and the multimedia resource set in a corresponding one of the entity making dimension and the entity site dimension to each predetermined sub-region being displayed in the predetermined sub-region.

2. The method according to claim 1, wherein the plurality of predetermined sub-regions comprises a first predetermined sub-region and a second predetermined sub-region, the first predetermined sub-region and the second predetermined sub-region being sequentially displayed in the second region, and the corresponding one of the entity making dimension and the entity site dimension to each of the first predetermined sub-region and the second predetermined sub-region being determined based on an attribute feature of the entity keyword.

3. The method according to claim 2, wherein:
when the attribute feature of the entity keyword is a first attribute feature, the first predetermined sub-region corresponds to the entity making dimension, and the second predetermined sub-region corresponds to the entity site dimension; and
when the attribute feature of the entity keyword is a second attribute feature, the first predetermined sub-region corresponds to the entity site dimension, and the second predetermined sub-region corresponds to the entity making dimension.

4. The method according to claim 1, wherein:
one of the plurality of predetermined sub-regions corresponds to the entity making dimension, and the multimedia resource set comprises a video and a plurality of key pictures corresponding to the video; and
the predetermined sub-region comprises a first part and a second part, the first part containing the video, the second part containing the plurality of key pictures corresponding to the video, and the first part and the second part having a same size in a predetermined direction.

5. The method according to claim 4, further comprising:
playing the video from a frame, corresponding to the key pictures, of the video in response to an operation instruction for the key pictures.

6. The method according to claim 5, further comprising:
controlling, in response to a slide instruction for the plurality of key pictures, the plurality of key pictures to move in the second part in a direction corresponding to the slide instruction.

7. The method according to claim 1, wherein:
one of the predetermined sub-regions corresponds to the entity making dimension, and the multimedia resource set comprises a plurality of key pictures of different sizes, and
the predetermined sub-region comprises a plurality of parts, each of the plurality of parts comprising at least one key picture, and the plurality of parts having a same size in a predetermined direction.

8. The method according to claim 1, wherein:
the multimedia resource set in corresponding one of the entity making dimension and the entity site dimension to each predetermined sub-region comprises a plurality of multimedia resources; and
the method further comprises:
controlling, in response to a slide operation, the plurality of multimedia resources in the predetermined sub-regions to move in the predetermined sub-regions.

9. The method according to claim 1, wherein:
the entity making dimension comprises a video-type entity making dimension and a graphic-text-type entity making dimension;

the plurality of predetermined sub-regions comprises a third predetermined sub-region and a fourth predetermined sub-region;

said displaying the multimedia resource set in the corresponding one of the entity making dimension and the entity site dimension to each predetermined sub-region in the predetermined sub-region comprises:

displaying a plurality of videos in the video-type entity making dimension in the third predetermined sub-region; and displaying a plurality of pictures or combinations of the plurality of pictures and videos in the graphic-text-type entity making dimension in the fourth predetermined sub-region.

10. The method according to claim 9 wherein the multimedia resource set in the entity site dimension comprises a plurality of third videos corresponding to different sites, position information of each of the sites being consistent with position information of a terminal initiating the search request.

11. The method according to claim 1, wherein:
the multimedia resource set in the entity making dimension comprises a plurality of first videos; and
the attribute dimensions further comprise an entity displaying dimension, a multimedia resource set in the entity displaying dimension comprising a plurality of second videos, each of the plurality of first videos having an aspect ratio different from an aspect ratio of each of the plurality of second videos.

12. The method according to claim 1, wherein the attribute dimensions further comprise an entity recommendation dimension, a multimedia resource set in the entity recommendation dimension comprising multimedia resources corresponding to a plurality of recommended entities, a category of each of the plurality of recommended entities being same as the target category, and the recommended entity being determined based on a historical search request within a predetermined period of time.

13. The method according to claim 1, further comprising:
updating the search result page in response to a slide instruction for the search result page, and controlling a position of the first region to be unchanged.

14. The method according to claim 1, wherein a displaying order of multimedia resources of the multimedia resource set in the entity making dimension is determined through a tool corresponding to the entity keyword in the multimedia resources.

15. The method according to claim 14, wherein said displaying the multimedia resource set in the corresponding one of the entity making dimension and the entity site dimension to each predetermined sub-region in the predetermined sub-region comprises:
displaying preview information on a plurality of videos in the entity making dimension in the predetermined sub-region, the preview information comprising a tool identifier corresponding to tool or video frames for displaying the tool.

16. An electronic device, comprising:
one or more processors; and
a memory configured to store one or more programs, wherein the one or more programs, when executed by the one or more processors, cause the one or more processors to:
receive a search request, the search request comprising an entity keyword attributing to a target category, wherein attribute dimensions of the target category at least comprise an entity making dimension and an entity site dimension;
acquire dimension information on the target category in the entity making dimension and the entity site dimension and a multimedia resource set of the entity keyword in each of the entity making dimension and the entity site dimension; and
display a search result page, the search result page comprising a first region and a second region, the dimension information in the entity making dimension and the entity site dimension being displayed in the first region, the second region comprising a plurality of predetermined sub-regions, and the multimedia resource set in a corresponding one of the entity making dimension and the entity site dimension to each predetermined sub-region being displayed in the predetermined sub-region.

17. The electronic device according to claim 16, wherein the plurality of predetermined sub-regions comprises a first predetermined sub-region and a second predetermined sub-region, the first predetermined sub-region and the second predetermined sub-region being sequentially displayed in the second region, and the corresponding one of the entity making dimension and the entity site dimension to each of the first predetermined sub-region and the second predetermined sub-region being determined based on an attribute feature of the entity keyword.

18. The electronic device according to claim 17, wherein:
when the attribute feature of the entity keyword is a first attribute feature, the first predetermined sub-region corresponds to the entity making dimension, and the second predetermined sub-region corresponds to the entity site dimension; and
when the attribute feature of the entity keyword is a second attribute feature, the first predetermined sub-region corresponds to the entity site dimension, and the second predetermined sub-region corresponds to the entity making dimension.

19. The electronic device according to claim 16, wherein:
one of the plurality of predetermined sub-regions corresponds to the entity making dimension, and the multimedia resource set comprises a video and a plurality of key pictures corresponding to the video; and
the predetermined sub-region comprises a first part and a second part, the first part containing the video, the second part containing the plurality of key pictures corresponding to the video, and the first part and the second part having a same size in a predetermined direction.

20. A non-transitory computer-readable storage medium, having a computer program stored thereon, wherein the computer program, when executed by a processor, causes the processor to:
receive a search request, the search request comprising an entity keyword attributing to a target category, wherein attribute dimensions of the target category at least comprise an entity making dimension and an entity site dimension;
acquire dimension information on the target category in the entity making dimension and the entity site dimension and a multimedia resource set of the entity keyword in each of the entity making dimension and the entity site dimension; and
display a search result page, the search result page comprising a first region and a second region, the dimension information in the at least two dimensions being displayed in the first region, the second region comprising a plurality of predetermined sub-regions, and the multimedia resource set in a corresponding one of the at least two dimensions to each predetermined sub-region being displayed in the predetermined sub-region.

\* \* \* \* \*